July 17, 1923.  
H. E. WARREN  
MAGNETIC SUSPENSION  
Filed Jan. 18, 1921

1,462,433

Inventor:
Henry E. Warren,
by Albert G. Davis
His Attorney.

Patented July 17, 1923.

1,462,433

UNITED STATES PATENT OFFICE.

HENRY E. WARREN, OF ASHLAND, MASSACHUSETTS, ASSIGNOR TO GENERAL ELECTRIC COMPANY, A CORPORATION OF NEW YORK.

MAGNETIC SUSPENSION.

Application filed January 18, 1921. Serial No. 438,224.

*To all whom it may concern:*

Be it known that I, HENRY E. WARREN, a citizen of the United States, residing at Ashland, county of Middlesex, State of Massachusetts, have invented certain new and useful Improvements in Magnetic Suspension, of which the following is a specification.

This invention relates to magnetic suspension for compensating for the weight of the movable elements in an instrument or meter.

Where instruments, such as electrical measuring instruments or time-keeping devices, must operate accurately, it is essential that all causes of inaccuracy be reduced to as low a value as possible. For example, in an electrical integrating meter where a shaft is rotated, friction enters in and some means should be used for making it as small as possible. One way in which this may be accomplished is by supporting the shaft in jewels and by suspending the shaft so that no weight rests upon the jewel bearing itself. For this latter purpose a so-called magnetic suspension is usually used. In order to float the shaft entirely so that it does not exert any pressure at either end, very accurate compensation for the weight it carries is necessary, and it is the main object of my invention to supply a readily adjustable means for compensating for the magnetic suspension.

Figure 1:
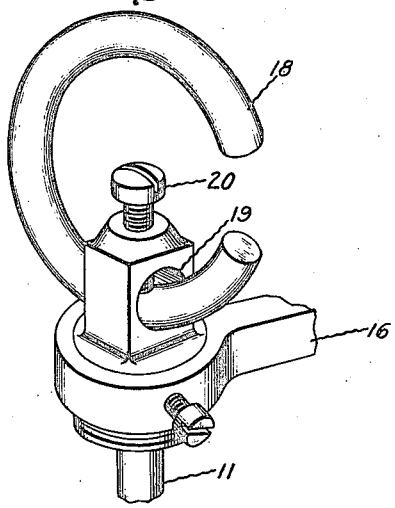
Figure 2:
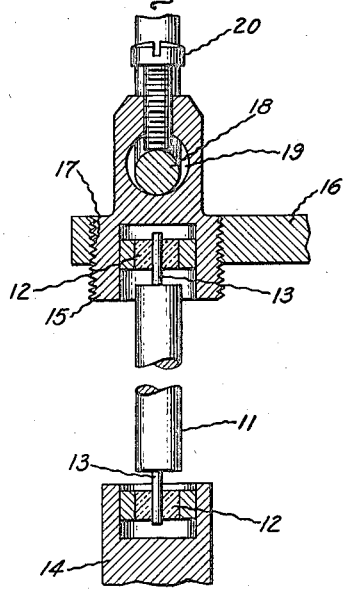

For a better understanding of my invention, reference it to be had to the specification and the accompanying drawings wherein Fig. 1 is a perspective view showing my improved device, while Fig. 2 is a sectional view of the same.

Referring now more in detail to the drawings, in which like reference characters refer to like parts throughout, a shaft or spindle 11 upon which may be supported the movable elements (not shown) of the instrument is appropriately supported in jewels 12 which accommodate the journals 13 of the spindle 11. The shaft 11 is made of magnetic material, such as steel. The jewels 12 are held in appropriate stationary supports 14 and 15. The upper support 15 is adjustably mounted in a stationary bracket 16 by means of screw-threads 17 carried by the support 15, engaging a tapped hole provided in the member 16. The jewel support 15 is appropriately formed so that it may accommodate adjustably a permanent magnet 18 near the upper end of the shaft 11 so that it may be influenced thereby. In this instance I have shown a permanent magnet of substantially circular cross-section and bent to form nearly a complete circle. This permanent magnet 18 passes through an aperture 19 located above the shaft 11 and it is clamped within the aperture by means of the set screw 20 passing through an appropriately located tapped hole in the support 15.

It is evident that the permanent magnet 18 is adjustable within the aperture 19. The nearer the poles of the permanent magnet 18 are to the end of the shaft 11, the greater is its effect thereon. Therefore by adjusting the position of magnet 18, a very accurate adjustment of the magnetic force acting upon the shaft 11 may be had, and consequently it is possible to compensate very carefully for the force of gravity acting upon it.

While I have shown in the accompanying drawing one embodiment of my invention, I do not wish to be limited thereto but aim to embrace in the appended claims all modifications falling fairly within the scope of my invention.

What I claim as new and desire to secure by Letters Patent of the United States is,—

1. An adjustable magnetic suspension for shafts comprising a shaft of magnetic material and a C shaped permanent magnet supported, in a vertical plane a fixed distance above said shaft, in a manner to permit the open portion of said permanent magnet to be vertically adjusted without vertically adjusting the magnet as a whole.

2. A magnetic suspension for shafts comprising a vertically disposed shaft of magnetic material, an upper bearing for said shaft, a support for said bearing having a horizontally disposed opening therein above said shaft, and a permanent magnet in the form of a nearly closed ring having its lower portion adjustably secured in said opening.

In witness whereof, I have hereunto set my hand this 14th day of January, 1921.

HENRY E. WARREN.